United States Patent [19]
Ang

[11] Patent Number: 5,946,125
[45] Date of Patent: Aug. 31, 1999

[54] REFLECTIVE SURFACE COATING FOR A UNIFORM INTENSITY OF A POLARIZED BEAM OF A ROTATING POLYGON MIRROR OPTICAL SCANNING SYSTEM

[75] Inventor: Anthony Ang, Long Beach, Calif.

[73] Assignee: Xerox Corporation, Stamford, Conn.

[21] Appl. No.: 09/016,547

[22] Filed: Jan. 30, 1998

[51] Int. Cl.$^6$ .................................................. G02B 26/08
[52] U.S. Cl. ........................... 359/216; 359/217; 359/584
[58] Field of Search .................................... 359/198–226, 359/584–587, 580, 581

[56] References Cited

U.S. PATENT DOCUMENTS

| | | | |
|---|---|---|---|
| 4,643,518 | 2/1987 | Taniguchi | 359/218 |
| 5,126,873 | 6/1992 | Ang | 359/217 |

*Primary Examiner*—James Phan
*Attorney, Agent, or Firm*—William Propp

[57] ABSTRACT

A three layer dielectric material coating of silicon dioxide/zinc selenide/silicon dioxide is deposited on the reflective surface of the facets of a rotating polygon mirror to provide a uniform intensity of a reflected beam over a wide range of angles of incidence and a wide range of beam wavelengths.

7 Claims, 3 Drawing Sheets

FIG. 1
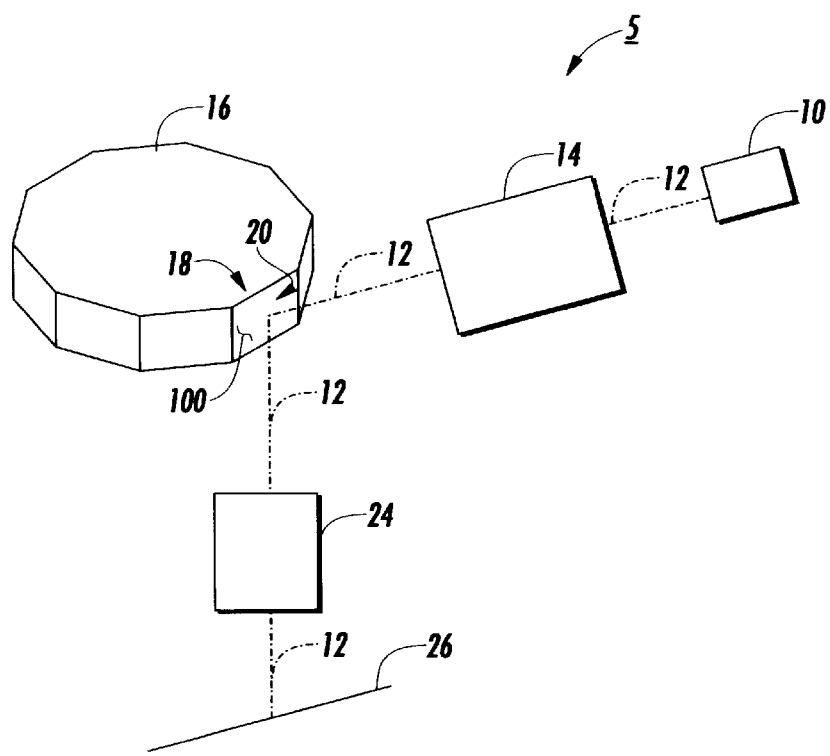
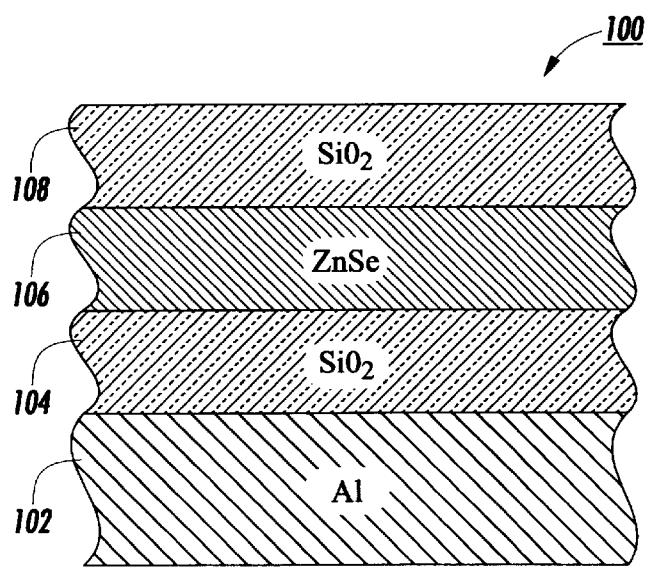
FIG. 2

Reflectance Data

| Angle | Wavelength | Refl. S | Refl. P | Refl. Ave | Transmission |
|---|---|---|---|---|---|
| 10.00 | | | | | |
| | 800.0 | 0.937724 | 0.936681 | 0.937202 | 0.062767 |
| | 750.0 | 0.940417 | 0.939394 | 0.939906 | 0.060065 |
| | 700.0 | 0.946078 | 0.944897 | 0.945488 | 0.054486 |
| | 650.0 | 0.953117 | 0.951704 | 0.952411 | 0.047566 |
| | 600.0 | 0.958290 | 0.956651 | 0.957470 | 0.042509 |
| | 550.0 | 0.957489 | 0.955496 | 0.956493 | 0.043486 |
| | 500.0 | 0.939845 | 0.936805 | 0.938325 | 0.061644 |
| 20.00 | | | | | |
| | 800.0 | 0.939237 | 0.935113 | 0.937175 | 0.062703 |
| | 750.0 | 0.941026 | 0.937187 | 0.939106 | 0.060776 |
| | 700.0 | 0.946163 | 0.941811 | 0.943987 | 0.055904 |
| | 650.0 | 0.953495 | 0.948142 | 0.950818 | 0.049084 |
| | 600.0 | 0.959709 | 0.953353 | 0.956531 | 0.043381 |
| | 550.0 | 0.960871 | 0.953194 | 0.957032 | 0.042880 |
| | 500.0 | 0.948796 | 0.937613 | 0.943205 | 0.056678 |
| 30.00 | | | | | |
| | 800.0 | 0.942073 | 0.932759 | 0.937416 | 0.062315 |
| | 750.0 | 0.942209 | 0.934320 | 0.938265 | 0.061473 |
| | 700.0 | 0.946049 | 0.937677 | 0.941863 | 0.057887 |
| | 650.0 | 0.953493 | 0.942799 | 0.948146 | 0.051625 |
| | 600.0 | 0.961188 | 0.947752 | 0.954470 | 0.045321 |
| | 550.0 | 0.964986 | 0.948600 | 0.956793 | 0.043002 |
| | 500.0 | 0.959322 | 0.936755 | 0.948039 | 0.051708 |
| 40.00 | | | | | |
| | 800.0 | 0.946713 | 0.929477 | 0.938095 | 0.061441 |
| | 750.0 | 0.944474 | 0.931492 | 0.937983 | 0.061567 |
| | 700.0 | 0.945663 | 0.934044 | 0.939853 | 0.059713 |
| | 650.0 | 0.952340 | 0.937409 | 0.944874 | 0.054714 |
| | 600.0 | 0.961708 | 0.940785 | 0.951246 | 0.048364 |
| | 550.0 | 0.968493 | 0.941369 | 0.954931 | 0.044683 |
| | 500.0 | 0.968401 | 0.932148 | 0.950274 | 0.049279 |
| 50.00 | | | | | |
| | 800.0 | 0.953652 | 0.924533 | 0.939093 | 0.060206 |
| | 750.0 | 0.948826 | 0.928839 | 0.938833 | 0.060506 |
| | 700.0 | 0.945555 | 0.932321 | 0.938938 | 0.060434 |
| | 650.0 | 0.949182 | 0.934811 | 0.941997 | 0.057398 |
| | 600.0 | 0.960042 | 0.935732 | 0.947887 | 0.051516 |
| | 550.0 | 0.970437 | 0.933389 | 0.951913 | 0.047468 |
| | 500.0 | 0.974921 | 0.922841 | 0.948881 | 0.050403 |

*FIG. 4*

REFLECTIVE SURFACE COATING FOR A UNIFORM INTENSITY OF A POLARIZED BEAM OF A ROTATING POLYGON MIRROR OPTICAL SCANNING SYSTEM

BACKGROUND OF THE INVENTION

This invention relates to a coating for a reflective surface, and, more particularly, to a coating which provides a uniform intensity in a polarized beam reflected from the reflective surface of a rotating polygon mirror over a wide range of incident angles and over a wide range of beam wavelengths.

Many conventional raster optical scanners utilize a multi-faceted rotating polygon mirror as the scanning element. A collimated beam of light of a single wavelength strikes the mirrored surface of the facets of the rotating polygon which causes the reflected light to revolve about an axis near the center of rotation of the rotating polygon and scan a straight line. This reflected light can be utilized as a scanning beam to scan a document at the input end of an imaging system or can be used as an imaging beam to imprint upon a photosensitive medium in the output mode.

The rotating polygon mirror of a raster output scanning system is typically formed of a reflective metal, such as aluminum. The aluminum substrate of the mirror is machined and polished to form flat reflective facets on the outside of a polygon. The aluminum facets are either left uncoated or, more commonly, given a dielectric material coating, such as silicon dioxide ($SiO_2$), to protect the mirror surface from oxidation and damage.

Aluminum tends to oxidize over time into the less reflective aluminum oxide ($Al_2O_3$). The mirrored surface of aluminum is sensitive to particle damage due to scratching and particularly since the polygon mirror is rotated at high speeds and occasionally cleaned. Hence, the reflective facets of the aluminum polygon mirror typically have a half wave optical thickness coating of silicon dioxide ($SiO_2$) for protection.

The reflectance of a mirrored surface varies with the angle of incidence of the light beam. The reflectance of the mirrored surface also varies with the wavelength of the incident light beam.

In raster optical scanners, it is essential that the intensity of the scanning beam be accurately controlled at the scan line for scanning or imaging. A uniform intensity is required for the beam reflected from the facets of the rotating polygon mirror for precise imaging and scanning along the scan line and from scan line to scan line. This uniform intensity is important for gray scale printing, for example. The more uniform the intensity of the output power of the imaging beam, the more uniform the print pattern across the printed page will be. This uniform intensity is also important for scanning of an input document.

Moreover, as the polygon mirror of the raster optical scanner rotates, the angle of the incident beam striking the reflective surface of a mirror facet will vary as will the angle of reflection of the reflected beam from the mirror facet. Therefore, the intensity of the incident beam must be uniform over a wide range of angles as the beam strikes the rotating polygon mirror facet and is reflected across the scan line.

It is an object of this invention to provide a uniform intensity for a incident beam over a wide range of angles as the beam strikes the rotating polygon mirror facet and is reflected across the scan line.

It is another object of this invention to provide a uniform intensity for a incident beam over a wide range of wavelengths as the beam strikes the rotating polygon mirror facet and is reflected across the scan line.

SUMMARY OF THE INVENTION

In accordance with the present invention, a three layer dielectric material coating of silicon dioxide/zinc selenide/silicon dioxide is deposited on the reflective surface of the facets of a rotating polygon mirror to provide a uniform intensity of a reflected beam over a wide range of angles of incidence and a wide range of beam wavelengths.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a schematic illustration of a perspective elevation of the rotating polygon mirror optical scanning system with a reflective surface coating formed according to the present invention.

FIG. 2 is a schematic illustration of a cross-sectional view of the three dielectric layer surface coating formed according to the present invention.

FIG. 4 is a table illustrating the reflectivity of the S polarization and the P polarization, the reflectivity of the average polarization and the uniformity of intensity for an incident coherent beam at varying angles of incidence and varying wavelengths to an embodiment of the coated reflective surface of a rotating polygon mirror formed according to the present invention.

DESCRIPTION OF THE PREFERRED EMBODIMENT

Figure 3:
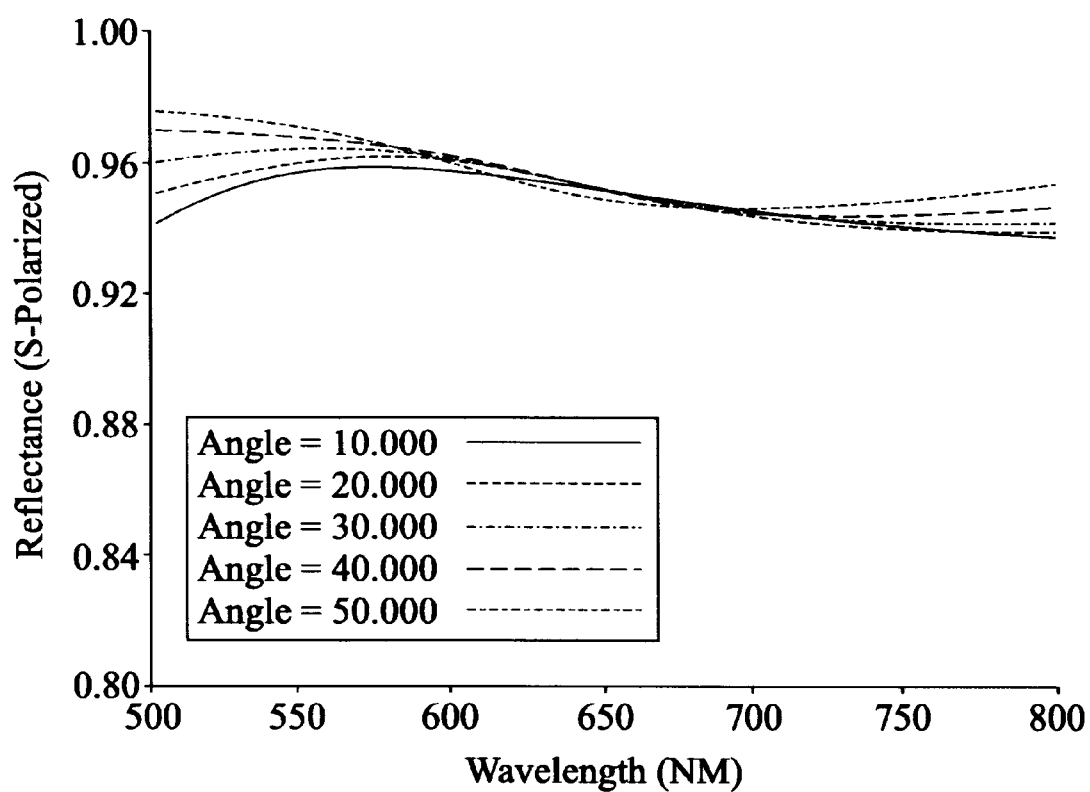
FIG. 3 is a graph illustrating the reflectivity of the S polarization and the uniformity of intensity for an incident coherent beam at varying angles of incidence and varying wavelengths to an embodiment of the coated reflective surface of a rotating polygon mirror formed according to the present invention.

Reference is now made to FIG. 1 wherein there is disclosed a rotating polygon mirror optical scanning system 5. A coherent light source 10 generates a light beam 12 of a single optical wavelength which passes through the pre-polygon mirror optics 14. The pre-polygon mirror optics 14 can include lenses, mirrors and other optical components to collimate, converge, diverge or otherwise modify the beam 12 prior to the beam striking the rotating polygon mirror 16. The pre-polygon mirror optics 14 may include means to modulate the beam if the optical scanning system is to be used to record on a scan line on a recording medium.

After the pre-polygon mirror optics 14, the beam is incident upon a facet 18 of the rotating polygon mirror 16 striking the reflective surface 20 of the facet. A coating 100 of dielectric materials has been deposited on the reflective surface and the beam will reflect on the coating 100 on the surface 20. After reflection from the facet 18 of the rotating polygon mirror 16, the beam 12 then passes through the post-polygon mirror optics 24 which can include lenses, mirrors and other components to collimate, converge, diverge or otherwise modify the beam 12 to focus the beam on the scan line 26 to either scan or record along that line.

Except for the coating 100 and the nature of the beam 12 which are the subject of the present invention, the rotating polygon mirror optical scanning system 10 is well known to those of ordinary skill in the art.

When light is reflected from a surface, the incident beam, the reflected beam, and the normal to the surface all lie in the same plane. The angle of incidence, for the purposes of the present invention, is defined in relation to the normal to the reflective surface. Thus, zero degrees of incidence is normal or perpendicular to the reflective surface while ninety degrees of incidence is parallel to the reflective surface. The reflection polarization refers to the orientation of the electric vector with respect to the incident/reflection plane. The perpendicular polarization is called the S polarization, and the parallel polarization is called the P polarization.

The reflectivity of a coated reflected surface on a facet of a rotating polygon mirror depends on certain criteria: the wavelength of the incident light, the optical thickness of the coating on the reflective surface of the facet, the polarization of the incident light, the angle of the incident/reflected light, and the refractive index of optical materials used, i.e. the coating and the reflective surface. The time varying criteria in a rotating polygon is the angle of incidence and the corresponding angle of reflection. The other variable criteria are independent of time and can be pre-determined.

The reflective surface coating 100 of FIG. 2 is formed on the polygon mirror facet 102. The facet is an aluminum (Al) substrate 102 with an index of refraction of 1.379 and an extinction coefficient of 7.6814. Upon the aluminum substrate 102 is deposited a first silicon dioxide ($SiO_2$) dielectric layer 104 which has an optical thickness of 0.24 of the incident beam wavelength and an index of refraction of 1.457. Upon the first layer 104 is deposited a second zinc selenide (ZnSe) dielectric layer 106 which has an optical thickness of 0.24 of the incident beam wavelength and an index of refraction of 2.6. Upon the second layer 106 is deposited a third silicon dioxide ($SiO_2$) dielectric layer 108 which has an optical thickness of 0.31 of the incident beam wavelength and an index of refraction of 1.457. The three dielectric material layers 104, 106 and 108 of silicon dioxide/zinc selenide/silicon dioxide form the coating 100 for the aluminum reflective surface 102.

There is a wide tolerance (plus or minus 10 percent) for the thicknesses of the layers 104, 106 and 108 of the reflective coating 100.

Other dielectric materials can be substituted for the ZnSe and $SiO_2$ of the reflective coating 100.

The dielectric material layers can be deposited by vacuum evaporation or other conventional means. The use of aluminum to form a rotating polygon mirror or aluminum reflective surfaces on the facets of a rotating polygon mirror formed of a non-aluminum material is well known to those of ordinary skill in the art.

As an illustrative example, the incident beam can be from a HeNe laser with a wavelength of 632.8 nanometers. The incident light beam can either be S-polarized or linearly polarized with an equal intensity in both the parallel and perpendicular planes (the P and S planes). The use of HeNe lasers in optical scanning is well known to those of ordinary skill in the art.

The optical thickness of the dielectric material layers 104, 106 and 108 is equal to the physical thickness of the dielectric material multiplied by the index of refraction of the dielectric material. The physical thickness will, therefore, be the optical thickness divided by the index of refraction. An optical thickness of 0.24 of the optical wavelength of a 632.8 nanometer beam would be 151.87 nanometers. For a dielectric material of silicon dioxide with an index of refraction of 1.4571 and an optical thickness of 151.87 nanometers, the physical thickness of the first layer 104 will be 104.23 nanometers. For a dielectric material of zinc selenide with an index of refraction of 2.6 and an optical thickness of 151.87 nanometers, the physical thickness of the second layer 106 will be 58.41 nanometers. An optical thickness of 0.31 of the optical wavelength of a 632.8 nanometer beam would be 196.17 nanometers. For a dielectric material of silicon dioxide with an index of refraction of 1.4571 and an optical thickness of 196.17 nanometers, the physical thickness of the third layer 108 will be 134.63 nanometers.

In the embodiment 100 of the present invention, the incident beam is S-polarized as shown in the graph of FIG. 3 or linearly polarized with an equal intensity of light in both the parallel and perpendicular planes, i.e. in both the S-polarization and the P-polarization, as shown in the table of FIG. 4. The beam is incident on the reflective surface of a facet of a rotating polygon mirror for a wide ranges of incident angles (10 to 50 degrees).

As show in the graph of FIG. 3 and the table of FIG. 4, the reflective surface coating of silicon dioxide/zinc selenide/silicon dioxide on aluminum has a high uniform reflectance of over 93 percent with less than one percent variation in reflectance from the range of 10 to 50 degrees of angles of incidence. The reflective surface coating also has a high reflectance of over 93 percent over a range of wavelengths of the incident beam from 500 to 800 nanometers. This wide range of wavelengths occurs even though the reflective surface coating has a single reference wavelength of 638.2 nanometers.

The percent of reflectivity of the average polarization in FIG. 4 is determined by adding the percentages of reflectivities of the S polarization and the P polarization and dividing the result by 2. The reflectivity of the polarization and the uniformity of intensity in FIGS. 3 and 4 are shown for angles of incidence from ten to fifty degrees by ten degree increments and beam wavelengths from 500 to 800 nanometers by 50 nanometer increments.

The upper silicon dioxide layer 108 also protects the reflective surface 102 of the mirror from oxidation and damage.

Typically, a S-polarization only linearly polarized light would be used in a rotating polygon mirror optical scanning system when a linearly polarized light with equal intensity in both the S and P polarizations cannot be maintained due to the laser source.

The reflective coating of the present invention may also be used in a RGB (red, green, blue) display.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. In an optical scanner employing an incident beam and a rotating polygon mirror, said rotating polygon mirror having at least one reflective surface, and said incident beam striking said at least one reflective surface and being reflected to a scan line, the improvement comprising:

means for generating a polarized coherent incident beam with a specified wavelength, and a coating of dielectric materials deposited on said at least one reflective surface, said coating having a first layer of a first dielectric material formed on said at least one reflective surface, a second layer of a second dielectric material formed on said first layer, and a third layer of said first dielectric material formed on said second layer, such that said incident beam reflected to said scan line from said at least one reflective surface has a uniformity of intensity over a wide range of angles of incidence and a wide range of wavelengths of said incident beam to said at least one reflective surface, wherein said at least one reflective surface being aluminum, said first dielectric material is silicon dioxide and said second dielectric material is zinc selenide.

2. In the optical scanner of claim 1 wherein said first layer of said coating has an optical thickness of 0.24 of said wavelength of said incident beam, said second layer of said coating has an optical thickness of 0.24 of said wavelength of said incident beam and said third layer of said coating has an optical thickness of 0.31 of said wavelength of said incident beam.

3. In the optical scanner of claim 1 wherein said first layer of said coating has an optical thickness of approximately one-quarter of said wavelength of said incident beam, said second layer of said coating has an optical thickness of approximately one-quarter of said wavelength of said incident beam and said third layer of said coating has an optical thickness of approximately three/tenths of said wavelength of said incident beam.

4. A coating for a reflective surface providing a uniformity of intensity over a wide range of angles of incidence and a wide range of wavelengths of an incident beam to said reflective surface comprising:

a reflective substrate, a first layer of a first dielectric material formed on said one reflective substrate, a second layer of a second dielectric material formed on said first layer, and a third layer of said first dielectric material formed on said second layer, wherein said first dielectric material is silicon dioxide and said second dielectric material is zinc selenide.

5. The coating for a reflective surface of claim 4 wherein said reflective substrate is aluminum.

6. The coating for a reflective surface of claim 4 wherein said first layer of said coating has an optical thickness of 0.24 of said wavelength of said incident beam, said second layer of said coating has an optical thickness of 0.24 of said wavelength of said incident beam and said third layer of said coating has an optical thickness of 0.31 of said wavelength of said incident beam.

7. The coating for a reflective surface of claim 4 wherein said first layer of said coating has an optical thickness of approximately one-quarter of said wavelength of said incident beam, said second layer of said coating has an optical thickness of approximately one-quarter of said wavelength of said incident beam and said third layer of said coating has an optical thickness of approximately three/tenths of said wavelength of said incident beam.

* * * * *